Jan. 28, 1969

H. T. YOUNG 3,424,501

CONVEYING SYSTEM

Filed July 11, 1967

INVENTOR

HENRY T. YOUNG

BY
Mason, Fenwick & Lawrence
ATTORNEYS

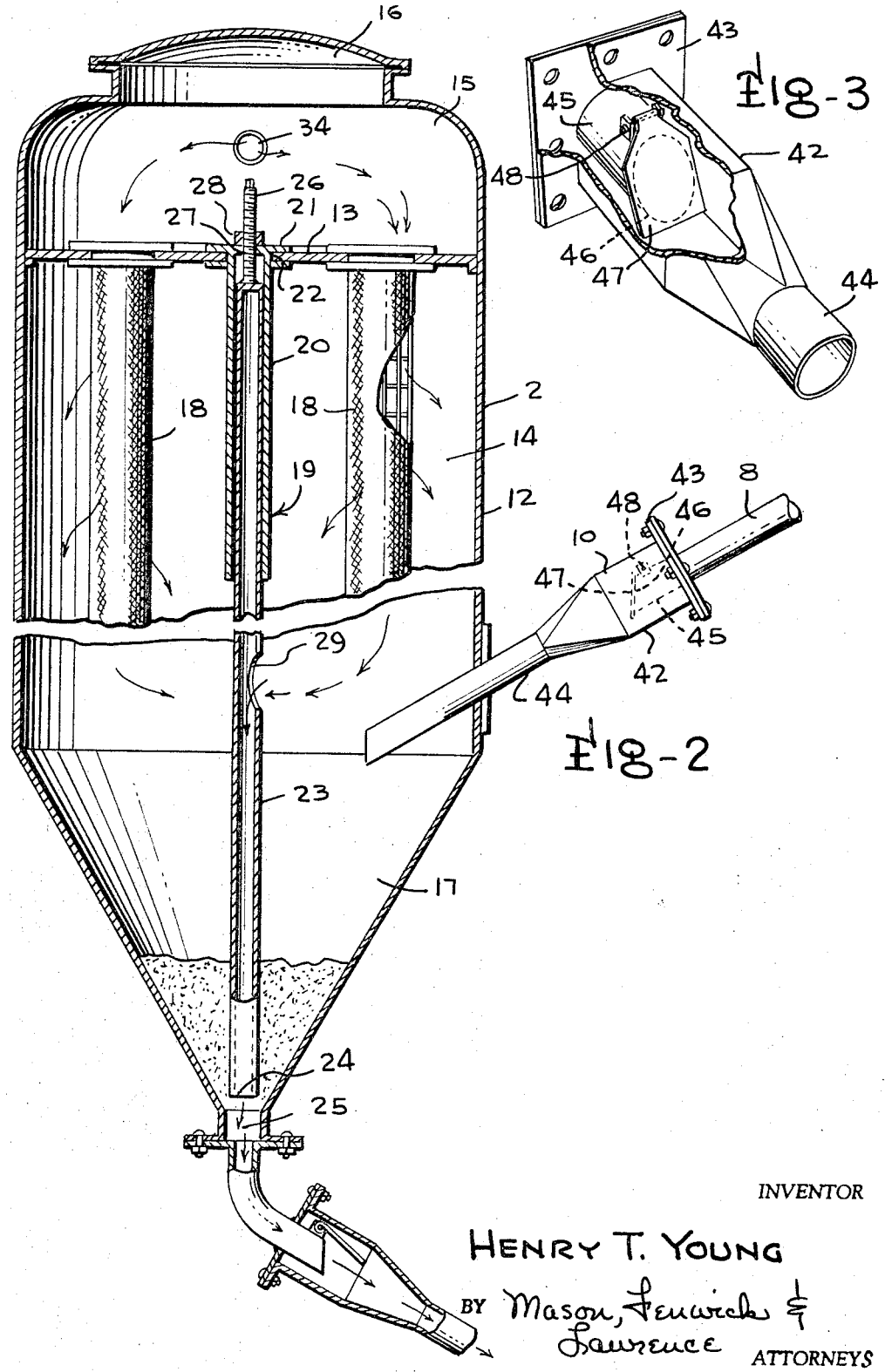

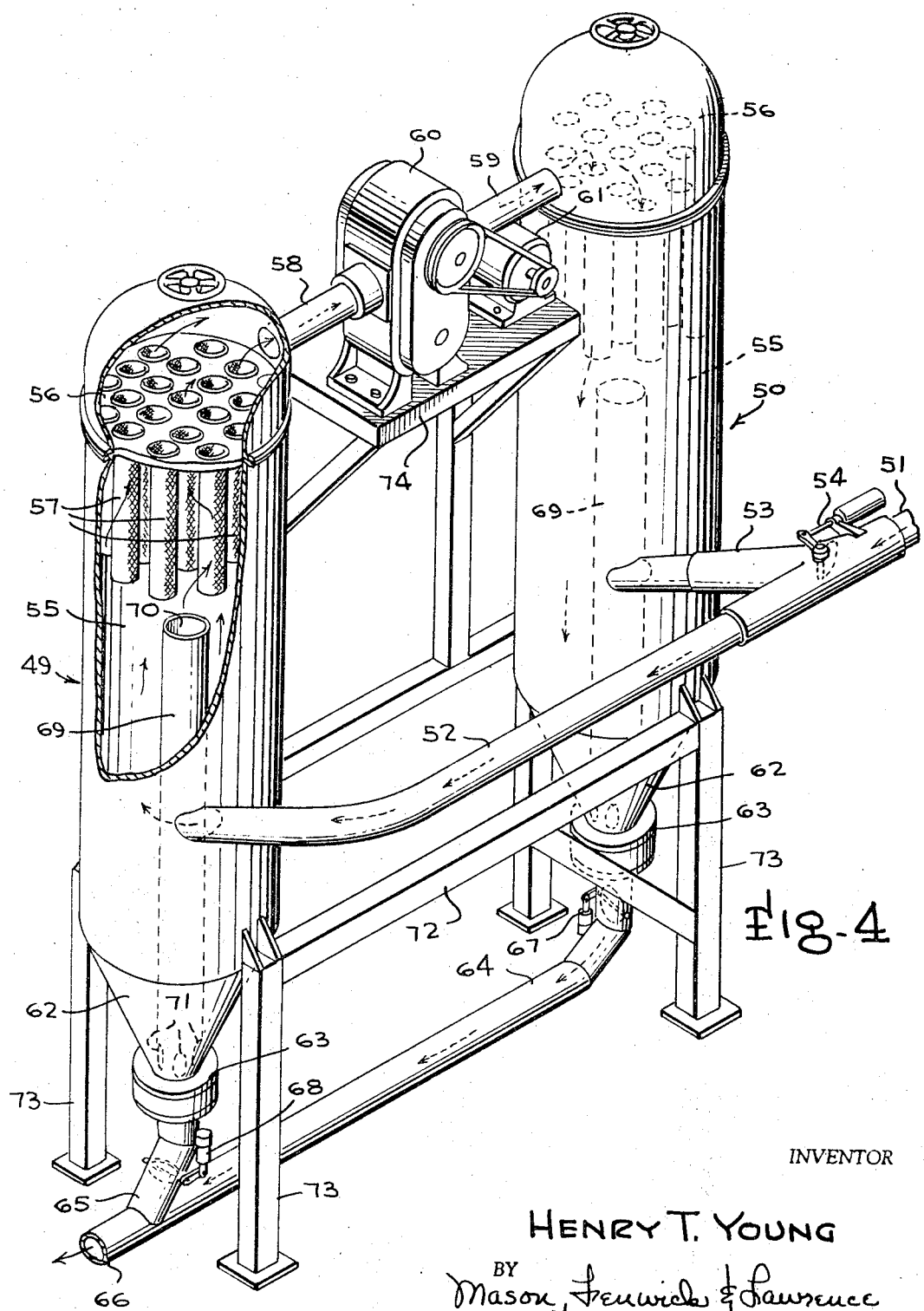

United States Patent Office 3,424,501
Patented Jan. 28, 1969

3,424,501
CONVEYING SYSTEM
Henry T. Young, R.D. 2, Muncy, Pa. 17756
Filed July 11, 1967, Ser. No. 652,514
U.S. Cl. 302—21                                          5 Claims
Int. Cl. B65g 53/04, 53/40

ABSTRACT OF THE DISCLOSURE

A double tank system for continuous unloading of particulate matter under negative pressure and conveying under positive pressure, with each tank containing a filter assembly. Material is sucked into a first tank and filtered, the separated material collecting in the first tank and the entraining fluid being pressurized and used to entrain and convey collected material in the second tank. The pressurized fluid entering the second tank passes through the filter assembly in reverse direction, back-washing the filter elements. Periodically the flow cycle is reversed, the second tank becoming the filtering and material storage tank, and the first tank becoming the filter back-washing and material conveying tank. The disclosure also includes a single tank reversely operated to provide for intermittent flow.

Background of the invention

This invention relates to conveying systems, and particularly to systems where particulate material is conveyed first by a fluid under negative pressure and then by a fluid under positive pressure.

It is frequently desirable in the handling of particulate, or granular materials, to pick up the material from a source of supply by vacuum means, and carry the material through a vacuum line to a predetermined point. At this point, the material is separated from the entraining fluid, and then carried to a point where it is to be stored, processed or used by mechanical means such as mechanical conveyors, or by introducing the material into a positive pressure conveying system. In order to separate the material being conveyed from the entraining fluid, it is necessary to use some type of separator, such as a cyclone, filter bag separator, or the like. When bag type filters are used, it is necessary to clean the filter bags periodically and this is frequently done by back-washing the bags with a fluid under pressure. Normally, this back-washing is of very short duration and plays no part in the movement of the particulate material.

Summary of the invention

The general object of the present invention is to provide a conveying system which will enable particulate material to be conveyed by fluid under negative pressure to a point where it will be separated from the entraining fluid by means of a bag type filter, with the system being operative to back-wash the filters periodically and to use the pressurized back-washing fluid as an entraining means to convey separated particulate matter from the separator by positive pressure fluid means.

A more specific object of the invention is to provide means for conveying matter as set out above wherein the separators are used in pairs and the separated conveying medium from one filter is used as the back-washing and positive conveying fluid for the other filter.

A further object is the provision of a dual separator system wherein the two separators are interconnected by valve controlled lines which permit reversal of flow, so that one separator may serve as a separator while the other is being back-washed and the back-wash fluid being used as a material transporting medium, and the flow can be periodically reversed.

Yet another object of the invention is to provide such a system in which the two tanks are interconnected and the compressor supplying pressure fluid is reversed to alternate the operation of the filter units.

It is also an object to provide a dual system of the kind referred to wherein the flow of material through the negative pressure side of the system, and the flow of pressure through the positive pressure side of the system will be continuous.

It is a still further object of the invention to provde a system using a single separator unit which will provide for intermittent conveying flow of the material.

Other objects of the invention will become apparent from the following descrtiption of practical embodiments thereof, when taken in conjunction with the drawings which accompany, and form part of, this specification.

Brief description of the drawings

FIGURE 2 is a vertical section through one of the separators;

FIGURE 3 is a perspective view of a typical check valve used with the system, parts being broken away to show interior structure;

FIGURE 4 is a perspective view of a double separator hook-up in which the compressor operation is reversed periodically to produce continuous flow.

Description of the preferred embodiments

Figure 1:
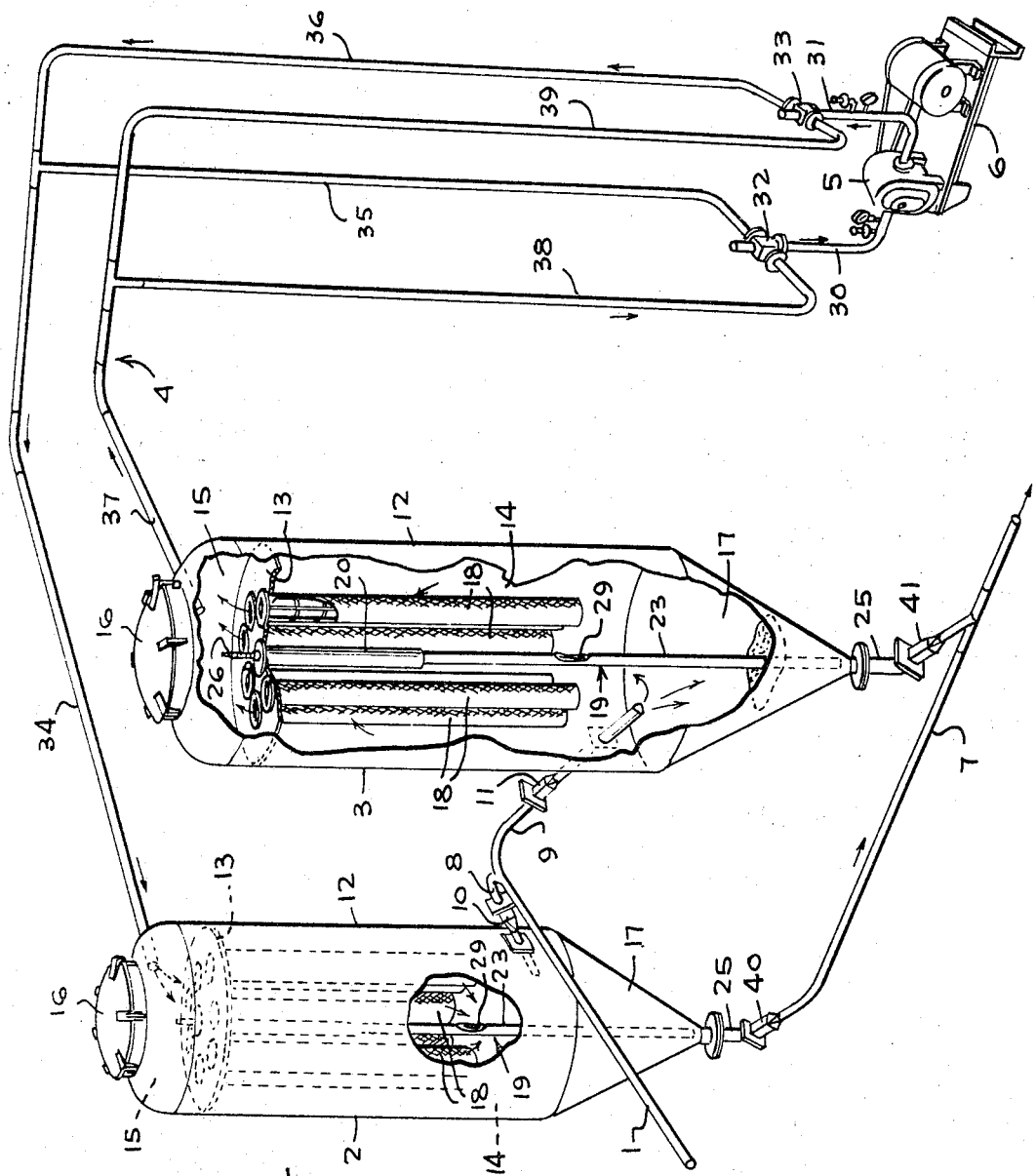
FIGURE 1 is a somewhat schematic illustration of a conveying system employing two bag type separators connected to provide for continuous conveying flow.

Referring first to that form of the invention shown in FIGURES 1, 2 and 3, the system includes an intake, negative pressure line 1, which is connected to each of two filter type separators 2 and 3. The separators, in turn, are connected by means of a pipe system 4 to a compressor 5 of a compressor-motor unit 6. An outlet line 7 is also connected to the separators 2 and 3.

Intake line 1 may be of any appropriate size, and extends from a bin, car, or other source of supply from which particulate material is to be moved. The line will be under negative pressure and material will be picked up by suction and carried through the line. The line has two branches 8 and 9, with the branch 8 being connected to the separator 2 and the branch 9 being connected to the separator 3. Branch line 8 includes a check valve 10, while branch 9 includes a check valve 11. The construction of the particular check valves will be described later.

Separators 2 and 3 are of a well known bag filter type. Each has a generally cylindrical casing 12, divided by a partition 13 into a lower filtering chamber 14 and an upper plenum chamber 15. The plenum chamber is closed by an access door 16, and the filtering chamber opens into a conical material accumulating chamber 17 at the bottom. The partition 13 is provided with a plurality of openings to receive the ends of cylindrical filter bags 18. The bags are of conventional type, being in the form of socks having closed bottoms and open tops, and formed of a material being pervious to the conveying medium and impervious to the particulate material. In conventional manner, material laden air, or other fluid conveying medium, will enter chamber 14 from the intake line and the conveying medium will pass through the material of the filter bags and to the plenum chamber. The separated material will drop into the accumulating chamber 17. Centrally of the separator there is a flow control pipe 19. This pipe is composed of a fixed section 20, which has a closed upper end and an encircling flange 21 to seat upon the partition 13 when the fixed section 20 is inserted through an opening 22 in the partition. A movable section 23 is telescopically mounted within the section 20 for vertical movement to adjust the spacing of the bottom 24 of the movable section from the bottom of the accumulating chamber 17 so as to be able to adjustably control the flow of material through the outlet 25 at the bottom of the accumulating chamber. The upper end of the movable section 23 carries a threaded stud 26, which passes through an opening 27 in the top flange 21 of the fixed section. A nut 28 is threaded onto the stud 26 for adjustably positioning the stud relative to the top of the movable section 23. The bottom 24 of the movable section is open, and there is an inlet opening 29 in the side of movable section 23 at a point above the top of the accumulating chamber 17. This will allow entraining air to pass through inlet 29 and down through the movable section of the flow control pipe to the outlet from the accumulating chamber.

The pipe system 4 from the separators to the compressor includes a pipe 30 connected to the intake side of compressor 5, and a pipe 31 to the outlet side of the compressor. Pipe 30 is controlled by a solenoid valve 32, while pipe 31 is controlled by a solenoid valve 33. A pipe 34 extends from the plenum chamber of separator 2, and this pipe has a branch line 35 which connects with one side of valve 32 and a branch line 36 which connects to the same side of valve 33. A second pipe line 37 is connected to the plenum chamber of separator 3, and it has a branch line 38 connected to one side of solenoid valve 32 and a branch line 39 connected to the similar side of the solenoid valve 33. By proper manipulation of valves 32 and 33, as will be described, conveying fluid flow to and from compressor 5 and the respective separators can be reversed as required.

The outlet 25 from separator 2 is connected by means of a check valve 40 to the outlet line 7 so that material can flow from the accumulating chamber in separator 2 out into the outlet line 7. A similar check valve 41 connects the outlet from separator 3 to the outlet line 7.

All of the check valves used in the system, check valves 10, 11, 40 and 41, are similar to the one shown in FIGURE 3. The valve consists of an outer casing 42 secured to a mounting flange 43 and having a cylindrical outlet end 44 for connection to the appropriate pipe line. A conduit section 45 projects from the flange 43 inwardly of the casing, and has a beveled inner end 46 over which a flap plate 47 is hingedly connected, as at 48, adjacent the upper side of beveled end 46. The inclination of the end 46 is such that it declines from the hinge connection 48 so that the flap plate will close by gravity when there is no pressure within the conduit section 45.

In operating the system, the valves 32 and 33 are set so as to operate in unison and to be oppositely disposed with respect to the branch lines connected to the pipe lines 34 and 37. For example, if valve 32 is set so as to have branch line 38 in open communication with the compressor intake line 30, then the valve 33 will be so positioned as to cut off communication between the branch line 39 and the outlet line 31 from the compressor. Assuming that the valves 32 and 33 are set in the position just given, the compressor 5 will operate to set up a negative pressure in inlet line 30, branch line 38, pipe 37, plenum chamber 15 of separator 3, filter chamber 14 of separator 3, branch line 9 and the inlet pipe 1. Therefore, material will be sucked into the inlet line and carried through that line into branch line 9. The negative pressure within the filter chamber 14 of separator 3 will cause the flap plate of check valve 11 to open so that incoming material will flow freely into the separator 3. The conveying medium will pass through filter bags 18, while the material which it conveyed will be separated and fall into accumulating chamber 17. The filtered conveying medium will pass from the bags into plenum chamber 15 of separator 3, pipe line 37, branch line 38, valve 32 and inlet line 30 to the compressor. The opposite side of the compressor will be under positive pressure conditions, so that outlet line 31 will be under positive pressure. The flow of positive pressure fluid will be through line 31, valve 33, branch line 36 and line 34 into the plenum chamber 15 of separator 2. The positive pressure air will go into the filter bags and out through the filter material into the filter chamber 14. This will serve to back-wash the bags, in known manner, so as to clean the bags of material which may be accumulated upon their exterior surfaces. Any material which is dislodged will fall into accumulating chamber 17 with previously deposited material. The positive pressure air within the filter chamber will exert a pressure upon the top of the accumulated material in the accumulating chamber 17, and it will flow through opening 29 to the interior of the movable section 23 of the control pipe 19. Air will pass out of the bottom of the control pipe into the outlet 25 of the separator 2 and it will entrain material in the bottom of the accumulating chamber and carry that material with it to check valve 40 and the outlet line 7. The pressure in the line will open the flap plate of check valve 40, while the negative pressure within the separator 3 will maintain the flap plate of check valve 41 in closed position. Thus, the material will be carried from its pick-up source through pipe line 1 while under negative pressure. It will be emptied into separator 3 and separated from the entraining fluid. The filtered fluid will then pass out of separator 3 and through compressor 5 to become the positive pressure fluid which is used to back-wash the filters in the separator 2 and to pick up accumulated material in the bottom of separator 2 and carry it to its final destination.

It is contemplated that valves 32 and 33 will be operated at timed intervals to reverse their positions. When the valves reverse, line 35 and pipe 34 become the negative pressure lines so that separator 2 is under suction and incoming material will flow through branch line 8 and check valve 10 into the filter chamber 4 of that separator. At the same time, branch line 39 and pipe 37 become the positive pressure lines and the filter bags 18 of separator 3 will be back-washed. The high pressure fluid will flow through control line 19 and pick up material which accumulated in the chamber 17 during the previous cleaning phase of the operating cycle. The amount of material entrained with the positive pressure fluid can be varied by raising or lowering the movable section 23 of the control pipe 19.

With the above described system, there is a continuous negative pressure in the inlet line bringing material into the separator 2 and 3 in alternation. There is also a continuous positive pressure fluid available to back-wash the filter bags of the inoperative separator and pick up accumulated material for delivery through the outlet pipe 7. Thus, there is a continuous flow of material under positive pressure through line 7.

Referring now to FIGURE 4, a slightly modified arrangement is shown wherein the reversal of flow direction is obtained by reversing the operation of the compressor. In this embodiment, the separators 49 and 50 are each connected to an inlet line 51. These connections are by means of branch lines 52 to separator 49 and branch line 53 from the inlet to separator 50. In this form there is a swinging gate valve 54 to alternately open and close the branch lines 52 and 53, which may be a solenoid operated valve. The separators will have filter chambers 55 and plenum chambers 56, and the usual filter bags 57 will hang within the filter chambers. The plenum chambers of the two separators are connected by pipes 58 and 59 to opposite sides of a compressor 60 which is operated by a reversible motor 61. Accumulating chambers 62 have outlets 63 connected by branch lines 64 and 65 to an outlet line 66. Solenoid valves 67 and 68 may be positioned in branch lines 64 and 65, respectively, and be operated simultaneously with valve 54 and the reversal of motor 61 driving the compressor.

In this form of the invention, the control pipe is shown as a stationary pipe 69, having an open top 70 and openings 71 around its base to allow the inflow of the separated material from the accumulating chamber 62 into the outlets 63.

The assembly is shown as mounted upon a frame 72, having legs 73 to support the frame from the floor and an elevated plateform 74 upon which the compressor and motor unit is mounted.

In operating this system, the motor 61 will be started to commence operation of the compressor 60. If the compressor is operating in a direction to draw fluid through line 58 and force it through line 59, valve 54 will be positioned so that branch line 52 is open and branch line 53 is closed. The valve 67 will be opened and valve 68 will be closed. This will cause negative pressure in line 51 to convey material from a source of supply through line 51, branch line 52, the filter chamber 55 of separator 49, through filter bags 57 which will cause the fluid to be separated from the material. The material will drop into the accumulating chamber 62 and the separated air will move into the plenum chamber 56 and through pipe 58 to compressor 60. Positive pressure air will be forced through pipe 59 into plenum chamber 56 of the separator 50 and into the interior of the filter bags of that separator. The fluid will pass through the bags from the inside to the outside, back-washing the bags and causing any material adhering to the outside of the bags to be removed and drop into the accumulating chamber 62. The positive pressure air will then fill the pressure chamber 55 of separator 50 and pass down through the interior of control pipe 69 to, and through, the outlet 63. As it passes through the outlet 63, it will entrain particulate material which will enter through the openings 71 in pipe 69. The material with its conveying fluid will then move through open valve 67 and through outlet line 66 to its point of deposit. After a timed cycle of operation, motor 61 will be reversed which will reverse the operation of the compressor. At the same time, valve 54 will reverse its position to open branch line 53 and close branch line 52. Valve 67 will close and valve 68 will open. The flow will then be from outlet pipe into separator 50 where the negative pressure conveying fluid will be separated from the conveyed material. Positive pressure air will then move from the compressor through pipe 58 into separator 49 to back-wash the filter bags 57 of the separator 49 and pick up material from the accumulating chamber and move it out through valve 68, branch line 65 and outlet pipe 66.

Figure 5:
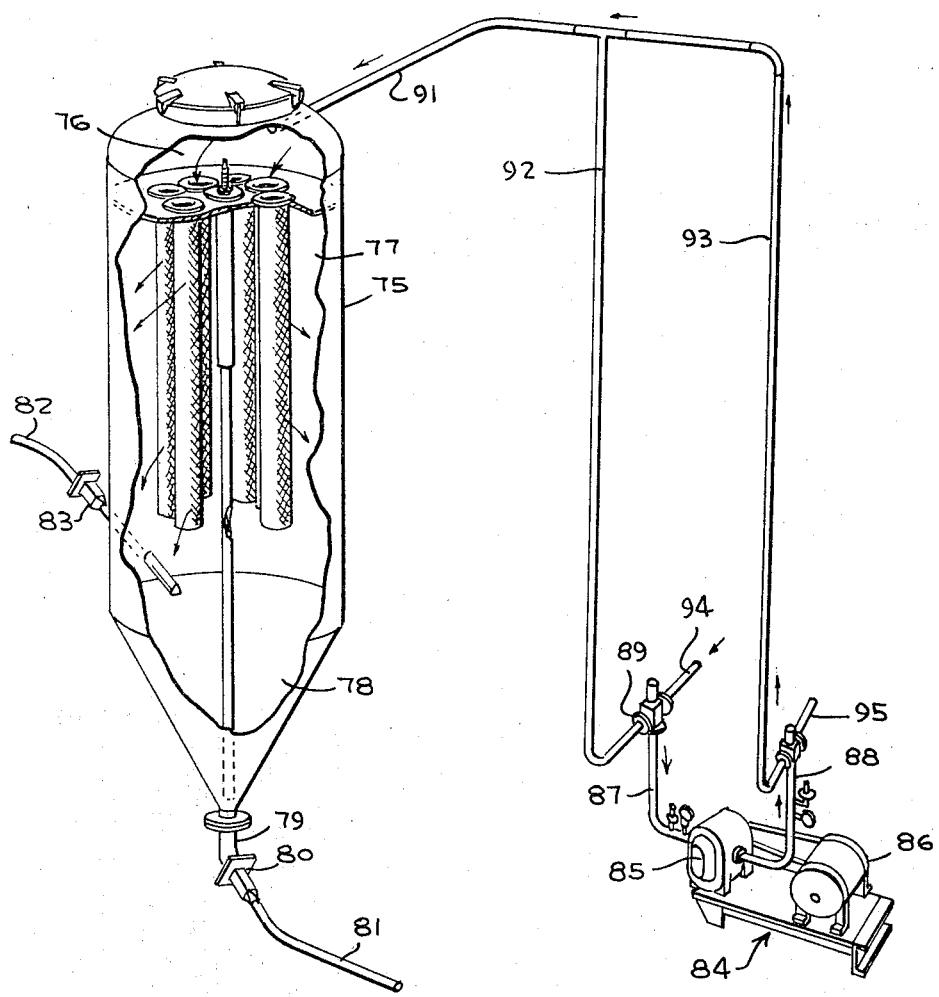
FIGURE 5 is a somewhat schematic illustration of a single tank system for providing intermitten flow.

A single unit system is shown in FIGURE 5. This system will not be capable of continuous operation, but will operate on a batch principle.

The single separating unit 75 is identical to each of the units shown in FIGURES 1, 2 and 3. It has a plenum chamber 76, a filter chamber 77, and an accumulating chamber 78. The outlet 79 from the accumulating chamber has a check valve 80, and the outlet conveying line 81 is connected to the valve. An inlet conveying line 82 has a check valve 83 and empties into the filter chamber 77 of the separator.

A compressor assembly 84 is used, consisting of a compressor 85 and motor 86, with an inlet pipe 87 leading to the compressor and an outlet pipe 88 leading from the compressor. Inlet pipe has a control valve 89, while outline line 88 has a control valve 90. A pipe line 91 is connected to the plenum chamber 76, and has two branch lines, a branch line 92 which leads to one side of valve 89, and a branch line 93 which leads to the similar side of valve 90. From the opposite side of valve 89, there is a short pipe 94 opening to atmosphere. A similar pipe 95 is connected to the valve 90.

In operating this form of the invention, the compressor will be started and the valves will be oppositely positioned. For example, if valve 89 is in position to connect branch line 91 to inlet pipe 87, then valve 90 will be in position to connect outlet pipe 88 to pipe 95 which is open to atmosphere. Thus, branch lines 92 and 91 will be under negative pressure, which will put the separator into the separating phase of its cycle. This will also put line 82 under negative pressure to convey material to the separator. The low pressure within the filter chamber will cause check valve 83 to open. With this arrangement, the material will come in through line 82 and be separated, the material falling into the accumulating chamber 78 and the separated conveying fluid moving out through lines 91, 92 and 87 to the compressor. The positive pressure output from the compressor will move through line 88, valve 90 and line 95 to atmosphere. After a timed period of operation valves 89 and 90 will be reversed. This will cause air to be drawn from atmosphere through line 91, valve 89 and line 87. Positive pressure fluid from the compressor will move through line 88, valve 90 and lines 93 and 91 to the separator. The filter bags will be back-washed, and the positive pressure fluid will enter control pipe 96 and move to outlet 79 where it will pick up particulate material and pass through check valve 80 into the outlet line 81. After a timed operation of this cycle, the valves 89 and 90 will reverse to their original position and a separating cycle will begin.

It will be noted that in all forms of the invention disclosed the separators work in timed cycles, first to separate the conveyed material from negative pressure conveying fluid, and then convert to a back-washing phase with the back-washing fluid being under positive pressure and serving as a medium for picking up, and conveying material which was separated during the first phase of the cycle. In those forms of the invention shown in FIGURES 1 through 4, the inflow and outflow of material is continuous, and the negative pressure conveying fluid which is separated from the material passes through the compressor and becomes the positive pressure conveying fluid for back-washing the other separator of the set and for conveying the previously separated particulate material.

While in the above several practical embodiments of the invention have been disclosed, it will be understood that the details of construction shown and described are merely by way of illustration and the invention may take other forms within the scope of the appended claims.

I claim:

1. A conveying system for particulate material comprising, an inlet conduit and an outlet conduit, a separator having a pervious filter with an accumulating chamber on one side of the filter, the inlet conduit opening into the separator on the accumulating chamber side of the filter, the accumulating chamber opening to the outlet conduit, propelling means for conveying fluid through the inlet conduit, separator and outlet conduit, a control tube in the accumulating chamber having an inlet opening at the top of the accumulating chamber and an opening communicating with the accumulating chamber adjacent the opening of the accumulating chamber to the outlet conduit, and a fluid conduit between the propelling means and the separator on the side of the filter opposite the accumulating chamber, whereby the propelling means can alternately draw conveying fluid under negative pressure through the inlet conduit, separator and filter, and force conveying fluid under positive pressure through the filter accumulating chamber and outlet conduit.

2. A conveying system for particulate material comprising, an inlet conduit and an outlet conduit, a separator having a pervious filter with an accumulating chamber on one side of the filter, the inlet conduit opening into the separator on the accumulating chamber side of the filter, the accumulating chamber opening to the outlet conduit, propelling means for conveying fluid through the inlet conduit, separator and outlet conduit, a fluid conduit connected to the separator on the side of the filter opposite the accumulating chamber, valves on the inlet and outlet conduits adjacent the separator to control conveying fluid flow to and from the separator, branch conduits having valves therein from the fluid conduit to opposite sides of the propelling means whereby the propelling means can alternately draw conveying fluid under negative pressure through the inlet conduit to the separator and through the filter and fluid conduit, and force conveying fluid under positive pressure through the fluid conduit and the filter into the accumulating chamber and through the outlet conduit, and a control tube in the accumulating chamber having an inlet opening adjacent the top of the accumulating chamber and an opening communicating with the accumulating chamber adjacent the opening of the accumulating chamber to the outlet conduit.

3. A conveying system for particulate material comprising, an inlet conduit and an outlet conduit, a pair of separators each having a pervious filter and an accumulating chamber on one side of the filter, branch inlets from the inlet conduit opening each into one separator on the accumulating chamber side of the filter, branch outlets from the outlet conduit with each accumulating tank opening to one branch outlet, propelling means for conveying fluid through the inlet conduit, separators and outlet conduit, a fluid conduit between the propelling means and each separator on the sides of the filter opposite the accumulating chambers, whereby the propelling means can draw conveying fluid under negative pressure through the inlet conduit, one separator and the filter of the one separator, and force fluid under positive pressure reversely through the filter of the other separator and the accumulating chamber of the other separator and the outlet conduit, means to reverse the propeller means to reverse the path of flow, and a control pipe in the accumulating chamber of each separator having an inlet opening adjacent the top of the accumulating chamber and an opening adjacent the opening of the accumulating chamber to the branch outlet.

4. A conveying system for particulate material comprising, an inlet conduit and an outlet conduit, a pair of separators each having a pervious filter and an accumulating chamber on one side of the filter, branch inlets from the inlet conduit opening each into one separator on the accumulating chamber side of the filter, branch outlets from the outlet conduit with each accumulating tank opening to one branch outlet, reversely operating check valves in the respective branch inlets and branch outlets, propelling means for conveying fluid through the inlet conduit, separators and outlet conduit, a fluid conduit between the propelling means and each separator on the sides of the filters opposite the accumulating chambers, whereby the propelling means can draw conveying fluid under negative pressure through the inlet conduit, one separator and the filter of the one separator, and force fluid under positive pressure reversely through the filter of the other separator and the accumulating chamber of the other separator and the outlet conduit, branch fluid conduits connected to each fluid conduit and to the propelling means, reversely operating valves to alternately communicate the branch fluid conduits of the respective fluid conduits to the negative pressure and positive pressure sides of the propelling means, and a control pipe in the accumulating chamber of each separator having an inlet opening adjacent the top of the accumulating chamber and an opning adjacent the opening of the accumulating chamber to the branch outlet.

5. A conveying system as claimed in claim 4 wherein, the control pipe is adjustable to vary the opening adjacent the opening of the accumulating chamber to the branch outlets.

References Cited

UNITED STATES PATENTS

| 1,113,024 | 10/1914 | Lechtenberg | 302—59 |
| 1,259,008 | 3/1918 | Fraser | 302—59 |
| 1,729,527 | 9/1929 | Titgen | 302—59 |
| 1,764,861 | 6/1930 | Vangelder | 302—59 |
| 2,234,788 | 3/1941 | Williams | 302—22 |

ANDRES H. NIELSEN, *Primary Examiner.*

U.S. Cl. X.R.

302—59